US009358574B2

(12) United States Patent
Kolberg et al.

(10) Patent No.: US 9,358,574 B2
(45) Date of Patent: Jun. 7, 2016

(54) METHOD FOR COATING METAL SURFACES WITH AN ACTIVATING AGENT PRIOR TO PHOSPHATING

(71) Applicant: Chemetall GmbH, Frankfurt am Main (DE)

(72) Inventors: Thomas Kolberg, Heppenheim (DE); Eckart Schoenfelder, Idstein (DE); Olaf Dahlenburg, Neu-Isenburg (DE); Manfred Walter, Hanau (DE)

(73) Assignee: Chemetall GmbH (DE)

( * ) Notice: Subject to any disclaimer, the term of this patent is extended or adjusted under 35 U.S.C. 154(b) by 333 days.

(21) Appl. No.: 14/063,209

(22) Filed: Oct. 25, 2013

(65) Prior Publication Data

US 2014/0051311 A1 Feb. 20, 2014

Related U.S. Application Data

(62) Division of application No. 13/131,106, filed as application No. PCT/EP2009/066680 on Dec. 9, 2009.

(30) Foreign Application Priority Data

Dec. 9, 2008 (DE) ......................... 10 2008 054 407

(51) Int. Cl.
*B05D 3/10* (2006.01)
*C09D 7/00* (2006.01)
*C23C 22/80* (2006.01)

(52) U.S. Cl.
CPC ................ *B05D 3/102* (2013.01); *C23C 22/80* (2013.01); *Y10T 428/2958* (2015.01); *Y10T 442/10* (2015.04)

(58) Field of Classification Search
None
See application file for complete search history.

(56) References Cited

U.S. PATENT DOCUMENTS

| | | | |
|---|---|---|---|
| 5,160,551 | A | 11/1992 | Rein et al. |
| 8,119,239 | B2 | 2/2012 | Inbe et al. |
| 2003/0185990 | A1 | 10/2003 | Bittner et al. |
| 2004/0170840 | A1 | 9/2004 | Matsukawa et al. |
| 2007/0231496 | A1 | 10/2007 | Eriksson et al. |
| 2008/0041498 | A1 | 2/2008 | Inbe et al. |

FOREIGN PATENT DOCUMENTS

| | | | |
|---|---|---|---|
| DE | 37 31 049 | A1 | 3/1989 |
| EP | 0 454 211 | A1 | 10/1991 |
| EP | 1 930 475 | A1 | 6/2008 |
| JP | 58-131177 | A | 8/1983 |
| WO | 2007/021025 | A1 | 2/2007 |

OTHER PUBLICATIONS

Applicant's Remarks made in parent U.S. Appl. No. 13/131,106 and originally filed Jul. 1, 2015.*

* cited by examiner

*Primary Examiner* — Colin W Slifka
(74) *Attorney, Agent, or Firm* — Jeremy J. Kliebert

(57) ABSTRACT

This invention relates to a method for phosphating metal surfaces in which the metal surfaces are treated with an aqueous phosphate and titanium-based colloidal activating agent prior to phoshating, wherein the activating agent comprises at least one water-soluble silicon compound having at least one organic group. The invention also relates to a corresponding activating agent.

16 Claims, No Drawings

METHOD FOR COATING METAL SURFACES WITH AN ACTIVATING AGENT PRIOR TO PHOSPHATING

This application is a division of U.S. patent application Ser. No. 13/131,106 filed May 25, 2011, which is incorporated herein by reference in its entirety for all purposes, which is a §371 of PCT/EP09/66680 filed Dec. 9, 2009 and claims priority of German Patent Application No. 10 2008 054 407.8 filed Dec. 9, 2008.

The invention relates to a process for phosphating metallic surfaces, wherein prior to being phosphated the metallic surfaces are treated with an aqueous colloidal activating agent based on titanium phosphate, and to corresponding activating agents.

Phosphating is a pretreatment process which has been used on metallic surfaces for many decades for short-term or lasting corrosion protection and often also to improve the adhesion of a subsequent primer or paint coat. The zinc-based phosphating processes, which are known as film-forming phosphating processes (i.e. they form clearly visible crystalline layers), are of outstanding quality and to date there are only limited options for replacing them with pretreatment processes with equivalent coating properties. In particular, zinc-nickel or zinc-manganese-nickel phosphates are of outstanding quality, and for reasons of corrosion protection and paint adhesion they are absolutely essential as a rule on aluminium-, iron- or zinc-rich metallic surfaces under an organic coating.

In order to form a high-quality coating, the zinc-based phosphating processes in particular require prior activation, wherein the clean or cleaned metallic surface is coated with nuclei based on phosphate colloid or/and phosphate particles and optionally with further substances.

Good activation allows the layer of crystalline zinc-containing phosphate to be largely to entirely closed when it is formed. Moreover, in many embodiments it is advantageous if the crystalline layer has a comparatively fine-particle character or/and is substantially formed from uniformly shaped crystals. For example, with good activation a coating of zinc-manganese-nickel phosphate conventionally has a coating weight in the range from 1.0 to 3.5 g/$m^2$ and phosphate crystals with an average crystal size of frequently less than 12 μm when viewed under a scanning electron microscope. If activation prior to this type of phosphating is omitted, however, then the phosphate coat formed typically has a coating weight in the range from 5 to 8 g/$m^2$ and phosphate crystals with a crystal size of frequently more than 30 μm when viewed under a scanning electron microscope. In the latter case the coating weight is far too high for paint adhesion to the subsequent primer or paint coat, as inadequate paint adhesion is to be expected with excessively thick phosphate coats. The consequence of excessively large phosphate crystals is reduced paint adhesion, reduced corrosion resistance, reduced mechanical strength of the phosphate coat, uneven paint surfaces and a markedly higher consumption of chemicals. The quality progression of these properties is often strictly proportional.

The activating agents currently available in the market commonly have a usage life in series production of only around one day before they have to be boosted again to a relatively large extent with a supplementary solution in order to remain or become functional or before they are replaced by a new batch solution. There are a few individual activating agents on the market which through the addition of organic polymer have a usage life in series production of up to around four or five days, this usage life then however being of only limited suitability for work within five working days. The limited usage life is manifested primarily in the fact that the phosphate coats formed during zinc phosphating undergo an increase in their coating weight over the working week from for example around 1.3 g/$m^2$ to for example 4.5 g/$m^2$ and hence an increase in their coating thickness too. A deterioration in the corrosion resistance and paint adhesion is moreover also associated with this phenomenon. In most automotive workshops coating weights of around 1.0 to around 3.5 g/$m^2$ are permissible in principle. A decrease in paint adhesion and a higher consumption of chemicals are also associated with a higher coating weight, however.

It is therefore advantageous for the change in the bath composition of the activating agent and in the coating weight and the other coating properties to vary less widely over the production period. The term “bath” stands here for the treatment bath.

The aim is therefore to develop and propose an activating agent which can be used if possible for five days (=one working week) and which exhibits only minor variations in its properties over this period (=long-term stability). If over the period of use only minor variations occur in the coating weight of the phosphate coat subsequently formed and in the average phosphate crystal size, the quality of activation too is regarded as good or even very good.

With the process according to the invention, values for the changes and variations in the coating weight in the range from ±0.3 to a maximum of ±1.0 g/$m^2$ were determined over the course of a week, depending on the laboratory test series and the installation, with the coating weights always remaining in the range between 1.0 and 3.5 g/$m^2$. It is advantageous if over the period of use an activating agent gives rise to only minor variations and changes in the properties of the phosphate coat formed during phosphating.

It is furthermore advantageous if an activating agent can also be used for a relatively long time at an elevated temperature, in other words if it has elevated thermal stability, i.e. if it can be used for extended periods at temperatures in the range from 30 to 60 or optionally even in the range from 30 to 80° C. An elevated thermal stability of this type makes the entire process less sensitive. Temperature variations, particularly in the higher temperature ranges, are then balanced out and ensure a consistent quality of the phosphate coat. If a less thermally stable activating agent is used for an extended period of time above its thermal stability limit, the agglomeration of colloids is accelerated and the activating effect therefore degrades substantially more quickly.

EP 0 454 211 B1 teaches processes for applying phosphate coatings to metal surfaces by activating with an activating agent based on titanium phosphate and then by zinc phosphating, wherein the metal surfaces are activated with an activating agent bath containing 0.001 to 0.060 g/l Ti, 0.02 to 1.2 g/l orthophosphate calculated as $P_2O_5$, 0.001 to 0.1 g/l Cu, and alkali compounds.

The object was therefore to propose an activating agent whose usage life is more suitable for series production owing to a longer-lasting stability or/and higher thermal stability.

The object is achieved by a process for phosphating metallic surfaces, wherein prior to being phosphated the metallic surfaces are treated with an aqueous colloidal activating agent based on phosphate and titanium, wherein the activating agent contains at least one water-soluble silicon compound having at least one organic group.

The aqueous colloidal activating agent according to the invention preferably contains titanium phosphate, orthophosphate, alkali metal and optionally at least one stabilising agent or/and at least one further additive. It preferably contains at least one hydrolysed or/and condensed silane/silanol/siloxane/polysiloxane.

In the process according to the invention the activating agent can preferably be a colloidal solution or colloidal dispersion or a powdered activating agent, wherein the latter is dissolved and dispersed for use in a coating process. A powdered activating agent can in particular have a residual water content optionally including water of crystallisation of between 0 and around 15 wt. %. At least one water-soluble silicon compound can preferably already be contained in a powdered activating agent or/and can be added only when the powdered activating agent is dissolved and dispersed in water.

An aqueous and often also colloidal activating agent such as the activating agent A can initially preferably have a water content in the range from 5 to 90 wt. % water. For production of a powdered activating agent such as activating agent B from an activating agent A, for example, an initial water content of 5 to 30 wt. % is preferred, for production of an aqueous activating agent such as activating agent D from an activating agent A, for example, an initial water content of 20 to 90 wt. % is preferred.

The aqueous and conventionally colloidal activating agent A is an aqueous mixture prepared for example by mixing the various components and optionally also by compounding and optionally with partial drying. The aqueous colloidal activating agent A can therefore optionally also be in powder form at the end of production.

At least one further substance, also in the dissolved or/and powdered state, can also be added if required to an aqueous or powdered activating agent, such as in particular to activating agent A or/and F, for example dipotassium phosphate, disodium phosphate, potassium pyrophosphate, sodium pyrophosphate, potassium tripolyphosphate, sodium tripolyphosphate, at least one other stabilising agent or/and at least one agent for pH adjustment for example, such as for example at least one carbonate or/and at least one borate.

Various processes are possible in principle for producing an aqueous colloidal activating agent. The most important processes are listed here.

In the process according to the invention in a process variant 1.) an aqueous to moist (="aqueous") activating agent such as activating agent A is preferably used in order firstly to produce a particularly storable powdered activating agent such as activating agent B by for example further drying, mixing, compounding or/and granulating, and in order then if required, prior to application of an activating agent C to metallic surfaces, to dissolve and to disperse the powdered activating agent B in water, in particular whilst stirring, in order for it then to be applied to the metallic surfaces. The powdered activating agent B conventionally contains colloidal titanium phosphate in a dried state. Furthermore, at least one substance such as for example at least one biocide, surfactant, stabilising agent or/and additive for pH adjustment can optionally be added, in particular during dissolution and dispersion.

In the process according to the invention in a process variant 2.) an aqueous colloidal activating agent according to the invention such as for example activating agent D can be prepared for example from an aqueous activating agent such as for example activating agent A, preferably by adding for example at least one stabilising agent. A particularly storable aqueous colloidal activating agent such as for example activating agent D can if necessary be diluted with water and can thus become the aqueous colloidal activating agent E according to the invention, which can then be applied to the metallic surfaces. The dilution preferably takes place whilst stirring. Furthermore, at least one substance such as for example at least one biocide, surfactant, stabilising agent or/and additive for pH adjustment can be added, in particular during dilution.

In the process according to the invention in a process variant 3.) a powdered activating agent F can be prepared by for example mixing the individual constituents and can in particular be storable. It preferably has a water content of between 0 and 8 wt. %. From this an aqueous colloidal activating agent according to the invention such as for example activating agent G can be prepared if required by for example dissolution and dispersion in water, in particular whilst stirring, which can then be applied to the metallic surfaces. It is preferable here for the colloids to be predominantly or entirely formed only at the dissolution and dispersion stage. Furthermore, at least one substance such as for example at least one biocide, surfactant, stabilising agent or/and additive for pH adjustment can optionally be added, in particular during dissolution and dispersion.

In the process according to the invention the aqueous colloidal activating agent according to the invention can be prepared from an aqueous colloidal activating agent (precursor A) via a powdered activating agent (precursor B) and prior to being applied to the metallic surfaces then dissolved and dispersed in water (activating agent C) or be prepared from an aqueous colloidal activating agent (precursor A) via an aqueous colloidal activating agent (precursor D) and prior to being applied to the metallic surfaces then diluted in water (activating agent E). Alternatively, prior to being applied to the metallic surfaces, the aqueous colloidal activating agent according to the invention can be dissolved and dispersed in water (activating agent G) from a powdered activating agent (precursor F).

The activating agents can preferably contain at least one stabilising agent. Such a stabilising agent stabilises the titanium phosphate colloids in particular. With some aqueous colloidal activating agents or/and in some situations of the activating agent bath, the titanium phosphate colloids can agglomerate more easily or/and more quickly and in particular reduce the activation quality after a short time if the aqueous colloidal activating agent contains no or too little stabilising agent. The stability and usage life are then limited. In some aqueous colloidal activating agents or/and in some situations of the activating agent bath, the addition or the content of stabilising agent is advantageous or even necessary for a longer stability of the activating agent bath. This is even true in particular sometimes for a working life and stability of an activating agent bath of more than 4 hours.

TABLE 1

Overview of the various activating agents, precursors, contents and state:

| Activating agent | Prepared from | Si compound | Titanium phosphate colloids | Stabilising agent | Usual concentration | State |
|---|---|---|---|---|---|---|
| A | — | optional | yes* | optional | highly concentrated | aqueous or moist |
| B | A | optional | dried yes* | optional | highly concentrated | powder |
| C | A via B | yes | yes | optional | treatment bath+ | aqueous |
| D | A | optional | yes | yes | highly concentrated | aqueous |
| E | A via D | yes | yes | yes | treatment bath+ | aqueous |
| F | — | optional | no | optional | highly concentrated | powder |
| G | F | yes | yes | optional | treatment bath+ | aqueous |

*mostly

+rather than the usual bath concentration it can also be a concentrate

The aqueous colloidal activating agents according to the invention such as activating agents C, E and G contain at least one water-soluble silicon compound having at least one organic group, whilst in some process variants an activating agent such as for example activating agents A, B, D and F contains at least one water-soluble silicon compound having at least one organic group.

Within the meaning of this application the terms “colloid(s)” and “colloidal” denote only titanium phosphate colloids and corresponding contents, as only these colloids exhibit a significant activating effect for a subsequent phosphating. Activating agent F conventionally contains no titanium phosphate colloids, as the powdered activating agent contains too little water to form colloids. The term “colloid(s)” conventionally requires the presence of an adequate amount of at least one liquid phase such as for example water.

An aqueous activating agent such as for example activating agent A, C, D, E or/and G typically contains dissolved and often also colloidal constituents. Its particles are typically partially or wholly within the particle sizes of the otherwise conventionally used term “colloidal” (e.g. finely divided particles with particle sizes of between around 1 and 100 nm or between 1 and for example 300 nm). However, they can also sometimes have a small proportion of particle sizes up to somewhere over 1 μm in size. The particle sizes of the activating agent were determined with a Zetasizer Nano ZS from Malvern Instruments Ltd. The pH values and conditions of the activating agent to be measured were chosen such that 0.1 g/l of solids and active substances were used with no further additives in the state of a bath solution. In many embodiments the particle size distribution of an activating agent is polydisperse, in other words in a bimodal or multimodal particle size distribution.

The ready-to-use colloidal activating agents according to the invention such as activating agents C, E and G are normally present in the concentration of the treatment bath of an activating agent bath, occasionally temporarily also in a somewhat higher concentration, before the concentration of the activating agent bath is adjusted by diluting with water. In the case of activating agents C and G experts conventionally refer to “powder activation”, whereas activating agents E are conventionally described in terms of “liquid activation”. In a precursor of the production process of an activating agent such as activating agent A, B, D and F an activating agent is conventionally present in a higher concentration than that of the treatment bath of an activating agent bath. They are preferably highly concentrated. They are normally precursors of the aqueous colloidal activating agents according to the invention which are used in the concentration of the treatment bath of an activating agent bath.

A powdered activating agent according to the invention such as activating agent B is preferably in the form of a powder, optionally a granulated powder. It can also be prepared in principle by spray drying. It is largely or entirely dry. A powdered activating agent preferably has a particle size distribution substantially in the range from 1 to 1000 μm, particularly preferably in the range from 10 to 500 μm, in the largely dry state, determined by screen analysis using screens with a screen aperture in the range from approx. 500 to approx. 25 μm. It preferably has an average particle size in the range from 25 to 150 μm, particularly preferably in the range from 40 to 80 μm. The powdered activating agent preferably exists in a readily free-flowing form. It is advantageous to make sure here that the moisture content of the powder is not too high. It is moreover advantageous if when stirred into water it disperses and dissolves well when dissolved or/and when dispersed. In the case of a powdered activating agent such as activating agent B the colloids are preferably dried. When a powdered activating agent such as activating agent B is dissolved, the colloids are of a high quality and conventionally also present in an adequate quantity.

The aqueous colloidal activating agents according to the invention such as for example activating agents C, E or/and G are typically present in a colloidal solution or/and colloidal suspension. Their titanium phosphate particles are typically partially or wholly colloidal.

An aqueous colloidal activating agent A differs from an aqueous colloidal activating agent C in the concentration or/and in the number of phases and optionally also in the overall chemical composition. The aqueous colloidal activating agent A often also has no substantial content of stabilising agent but rather in terms of phosphates often contains substantially or entirely only at least one orthophosphate and titanium phosphate. It is often highly concentrated.

Surprisingly it has been found that by adding at least one stabilising agent to an aqueous and optionally colloidal activating agent such as activating agent A, C, D, E or/and G an in some cases very pronounced rise in the stabilisation and longevity of the activating agent occurs.

If an aqueous colloidal activating agent according to the invention such as in particular an activating agent C, E or/and G is unstable, then it is advantageous or even necessary to add stabilising agent. Stability is associated with too low or too high a tendency of the colloids to agglomerate or with a lack of colloids. Agglomerates or a lack of colloids have little or no activating effect.

An aqueous colloidal activating agent according to the invention such as activating agent C which contains no stabilising agent preferably differs from an activating agent of a precursor such as activating agent A because of its dilution and it is normally in a somewhat more stable state as the colloid agglomeration is lower. An aqueous colloidal activating agent according to the invention such as activating agent C containing at least one stabilising agent differs in particular from an activating agent of a precursor such as activating agent A through a markedly increased stability and hence through markedly improved properties overall in the coating process and in the phosphate coating.

The aqueous colloidal activating agent D is often a concentrate. It contains colloids in the aqueous phase. Its stability is normally ensured by the inclusion of at least one stabilising agent.

An aqueous colloidal activating agent according to the invention such as for example activating agent E can be prepared from an aqueous more highly concentrated colloidal activating agent of a precursor such as activating agent D by diluting with water and optionally adding at least one substance such as for example at least one biocide, surfactant, stabilising agent or/and additive for pH adjustment.

A powdered activating agent F can be mixed from the individual substances and mixtures to be added in the dry or largely dry state (normally with a water content up to a maximum of 8 or even up to a maximum of 15 wt. %), in a mixer for example. Mixing, compounding or/and granulating can preferably take place. The water content is preferably contained only or almost only as water of crystallisation or/and as residual moisture. There are normally no or virtually no colloids.

An aqueous colloidal activating agent according to the invention such as activating agent G can be prepared from a powdered activating agent of a precursor such as activating agent F by dissolving and dispersing in water, for example whilst stirring, and optionally adding at least one substance such as for example at least one biocide, surfactant, stabilising agent or/and additive for pH adjustment.

The colloids form from the content of titanium phosphate-containing substances in contact with water. In some cases the activation quality of an aqueous activating agent G is somewhat less good than that of the aqueous activating agents C and E. However, the production costs for the aqueous activating agent G are often lower, and for simple applications the activating agent quality of activating agent G is usually adequate.

The concentrates and baths of an aqueous colloidal activating agent according to the invention such as activating agent C, E and G often have very similar or identical properties. The properties of the phosphate coats after prior activation with an aqueous colloidal activating agent according to the invention such as aqueous activating agent C, E or G are often very similar or identical. The suitability and quality of the activating agent bath can be determined in particular from the coating weight, the visually detectable uniformity of the zinc phosphate coat, the degree of coverage with the zinc phosphate coat, corrosion test results or/and paint adhesion test results.

An activating agent such as activating agent A, B, C, D, E, F or/and G preferably contains as the main constituent or as a substantial constituent at least one phosphate such as for example at least one sodium-, potassium- or/and titanium-containing phosphate, in particular as the main constituents sodium or/and potassium orthophosphate(s) and at least one titanium-containing phosphate.

The phosphates in an aqueous colloidal activating agent such as activating agent A, C, D, E or/and G are preferably in the form of titanium phosphate, titanyl phosphate, disodium phosphate or/and dipotassium phosphate. Furthermore, an aqueous colloidal activating agent such as in particular activating agent A, C, B, E or/and G can optionally also have a content of at least one stabilising agent such as for example pyrophosphate or/and tripolyphosphate.

In the process according to the invention the content of phosphate calculated as phosphate compounds is preferably in the range from 0.05 to 400 g/l and in particular in the range from 0.10 to 280 or from 0.20 to 200 g/l in an aqueous activating agent such as activating agent A, C, D, E or/and G and in the range from 0.5 to 98 wt. % and in particular in the range from 3 to 90 or from 10 to 80 wt. % (for concentrates and baths) in a powdered activating agent such as activating agent B or/and F.

In the process according to the invention the content of phosphate calculated as $PO_4$ is preferably in the range from 0.005 to 300 g/l and in particular in the range from 0.010 to 200 or from 0.020 to 100 g/l in an aqueous activating agent such as activating agent A, C, D, E or/and G and in the range from 0.1 to 80 wt. % and in particular in the range from 1 to 65 or from 10 to 50 wt. % (for concentrates and baths) in a powdered activating agent such as activating agent B or/and F.

If silicate-containing detergents are introduced from one of the preceding baths, this silicate content and this silicate are not included in the term "silicon compound" within the meaning of this application.

In some embodiments the at least one silane/silanol/siloxane/polysiloxane is optionally not yet included in an aqueous or powdered activating agent precursor such as activating agent A, B, D or F and is added only during the preparation of an aqueous colloidal activating agent according to the invention such as activating agent C, E or G.

In the process according to the invention the total content of water-soluble silicon compounds having at least one organic group is either around zero in an activating agent precursor such as in activating agent A, B, D or F or preferably 0.0001 to 50 g/l and in particular 0.001 to 20 g/l, in particular for coating metallic surfaces 0.001 to 0.2 g/l, in an aqueous activating agent such as in activating agent A, C, D, E or/and G and preferably around zero or 0.001 to 25 wt. % and in particular 0.01 to 5 wt. % in a powdered activating agent such as in activating agent B or/and F, calculated in each case as silane or/and as the corresponding silicon-containing starting compound that is principally present (for concentrates and baths).

Within the meaning of this application the term "silane" or "silanes/silanols/siloxanes/polysiloxanes" is used for silanes, silanols, siloxanes, polysiloxanes and reaction products or derivatives thereof, which are often mixtures of "silanes". A polysiloxane can also be added. The addition of at least one silane having at least one organic group is particularly preferred, the term "silane" conventionally being used because it is often not known whether the "silane", which is often acquired by purchase, is at least one silane, at least one silanol, at least one siloxane, at least one polysiloxane or some mixture of these substances. Even with "silanes" derived in-house it is often impossible, or possible only with exceptionally great effort, to determine which substances are present at a particular preparation stage or after storage or after addition to a solution or suspension. Owing to the often complex chemical reactions which occur and the laborious analysis and work involved, the various additional silanes or other reaction products can mostly not be specified.

The at least one organic group of the water-soluble silicon compound can for example independently be at least one aliphatic, cycloaliphatic, heterocyclic or/and aromatic group which is independently saturated or unsaturated and which independently has at least one or no functional group. The at least one functional group can be selected in particular from aldehyde groups, amido groups, amino groups, carbonyl groups, ester groups, ether groups, urea groups, hydroxide groups, imido groups, imino groups, nitro groups or/and oxiran groups. The at least one water-soluble silicon compound can have one, two or more than two silicon atoms in the molecule. Its molecule can optionally be branched or/and can assume a two-dimensional or three-dimensional form.

In the process according to the invention at least one hydrolysable or/and at least one at least partially hydrolysed silane can preferably be included as the silicon compound in an activating agent such as in activating agent A, B, D, E, F or/and G. At least one monosilyl silane, at least one bis-silyl silane or/and at least one tris-silyl silane can preferably be included. At least one allylsilane, alkoxysilane, aminosilane, succinic acid anhydride silane, cycloalkyl silane, cycloalkoxysilane, epoxy silane, phenylsilane or/and vinyl silane can preferably be included. Such silanes/silanols/siloxanes which have a chain length in the range from 2 to 5 C atoms and a functional group, wherein the latter can be suitable for reacting with polymers, are preferred in particular. The activating agent according to the invention can in particular contain a mixture of at least two silanes, such as for example 1.) at least two aminosilanes such as for example at least one monoaminosilane and at least one bis-aminosilane, such as for example 2.) at least one bis-silyl silane such as for example at least one bis-aminosilane and at least one alkoxysilane such as for example at least one trialkoxysilyl propyl tetrasulfane, or such as for example 3.) at least one vinyl silane and at least one bis-silyl silane such as for example at least one bis-aminosilane.

The aqueous composition preferably contains at least one silane selected from the group of
glycidoxyalkyltrialkoxysilane,
methacryloxyalkyltrialkoxysilane,
(trialkoxysilyl)alkyl succinic acid silane,
aminoalkylaminoalkylalkydialkoxysilane,
(epoxycycloalkyl)alkyltrialkoxysilane,
alpha-aminoalkyliminoalkyltrialkoxysilane,
bis-(trialkoxysilylalkyl)amine,
bis-(trialkoxysilyl)ethane,
(epoxyalkyl)trialkoxysilane,
aminoalkyltrialkoxysilane,
ureidoalkyltrialkoxysilane,
N-(trialkoxysilylalkyl)alkylenediamine,
N-(aminoalkyl)aminoalkyltrialkoxysilane,
N-(trialkoxysilylalkyl)dialkylenetriamine,
poly(aminoalkyl)alkyldialkoxysilane,
tris(trialkoxysilyl)alkylisocyanurate,
ureidoalkyltrialkoxysilane and
acetoxysilane.

The aqueous composition preferably contains at least one silane selected from the group of
3-glycidoxypropyltriethoxysilane,
3-glycidoxypropyltrimethoxysilane,
3-methacryloxypropyltriethoxysilane,
3-methacryloxypropyltrimethoxysilane,
3-(triethoxysilyl)propyl succinic acid silane,
alpha-aminoethyliminopropyltrimethoxysilane,
aminoethylaminopropylmethyldiethoxysilane,
aminoethylaminopropylmethyldimethoxysilane,
beta-(3,4-epoxycyclohexyl)ethyltriethoxysilane,
beta-(3,4-epoxycyclohexyl)ethyltrimethoxysilane,
beta-(3,4-epoxycyclohexyl)ethyltrimethoxysilane,
beta-(3,4-epoxycyclohexyl)methyltrimethoxysilane,
gamma-(3,4-epoxycyclohexyl)propyltriethoxysilane,
gamma-(3,4-epoxycyclohexyl)propyltrimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
gamma-aminopropyltriethoxysilane,
gamma-aminopropyltrimethoxysilane,
gamma-ureidopropyltrialkoxysilane,
N-(3-(trimethoxysilyl)propyl)ethylenediamine,
N-beta-(aminoethyl)-gamma-aminopropyltriethoxysilane,
N-beta-(aminoethyl)gamma-aminopropyltrimethoxysilane,
N-(gamma-triethoxysilylpropyl)diethylenetriamine,
N-(gamma-trimethoxysilylpropyl)diethylenetriamine,
N-(gamma-triethoxysilylpropyl)diethylenetriamine,
N-(gamma-trimethoxysilylpropyl)diethylenetriamine,
poly(aminoalkyl)ethyldialkoxysilane,
poly(aminoalkyl)methyldialkoxysilane,
tris(3-(triethoxysilyl)propyl)isocyanurate,
tris(3-(trimethoxysilyl)propyl)isocyanurate and
vinyltriacetoxysilane.

Particularly preferred silicon compounds are bis(3-trimethoxysilylpropyl)amine, bis(3-triethoxysilylpropyl)amine, 3-aminopropyltriethoxysilane, bis-(triethoxysilyl)ethane, phenylaminopropyltrimethoxysilane, 3-(triethoxysilyl)propyl succinic acid anhydride, 3-glycidoxypropyltrimethoxysilane and triamino-functional siline.

In the process according to the invention the activating agent preferably contains at least one partially or wholly hydrolysed silane/silanol/siloxane or/and optionally also condensed silane/silanol/siloxane/polysiloxane as the silicon compound.

In the process according to the invention the content of titanium is preferably in the range from 0.0001 to 10 g/l and in particular in the range from 0.001 to 5 or from 0.005 to 1 g/l in an aqueous activating agent such as activating agent A, C, D, E or/and G and preferably around zero or in the range from 0.001 to 10 wt. % and in particular in the range from 0.005 to 2 or from 0.01 to 1 wt. % (for concentrates and baths) in a powdered activating agent such as activating agent B or/and F.

In the process according to the invention the total content of cobalt, copper or/and nickel is preferably around zero or in the range from 0.00001 to 0.1 g/l and in particular in the range from 0.0005 to 0.05 or from 0.01 to 0.02 g/l in an aqueous activating agent such as activating agent A, C, D, E or/and G and preferably around zero or in the range from 0.0001 to 2 wt. % and in particular in the range from 0.001 to 0.8 or from 0.01 to 0.4 wt. % (for concentrates and baths) in a powdered activating agent such as activating agent B or/and F. A content of cobalt, copper or/and nickel can help to refine the phosphate coat and has a bactericidal effect.

In the process according to the invention a weight ratio of the contents of titanium to those of water-soluble silicon compounds having at least one organic group (calculated in each case as silane or/and as the corresponding silicon-containing starting compound) in the range from (0.3-2.6):1 has proved to be good, and in the range from (0.2-3.0):1 at least adequate.

In the process according to the invention the total content of sodium or/and potassium is preferably in the range from 0.005 to 300 g/l and in particular in the range from 0.01 to 200 or from 0.02 to 100 g/l in an aqueous activating agent such as activating agent A, C, D, E or/and G and preferably in the range from 0.1 to 70 wt. % and in particular in the range from 1 to 60 or from 10 to 50 wt. % (for concentrates and baths) in a powdered activating agent such as activating agent B or/and F.

In the process according to the invention the activating agent can preferably also include a content of at least one biocide, wetting agent, softening agent, complexing agent, sequestering agent, stabilising agent or/and marker.

In the process according to the invention the total content of at least one marking ion or/and at least one marking compound (marker by virtue of its colour, its fluorescence or/and its chemical or/and physical analysability) such as for example based on lithium, lanthanide(s), yttrium or/and tungsten as a dye marker or/and as a fluorescence marker can preferably be around zero or in the range from 0.0001 to 100 g/l and in particular in the range from 0.001 to 10 or from 0.01 to 1 g/l in an aqueous activating agent such as activating agent A, C, D, E or/and G and preferably around zero or in the range from 0.001 to 20 wt. % and in particular in the range from 0.01 to 10 or from 0.1 to 1 wt. % (for concentrates and baths) in a powdered activating agent such as activating agent B or/and F.

Furthermore, at least one softening agent (=water hardness binding agent) such as for example at least one dicarboxylic acid, tricarboxylic acid, higher carboxylic acid, polycarboxylic acid, oxydicarboxylic acid, oxytricarboxylic acid, higher oxycarboxylic acid, polyoxycarboxylic acid, phosphonic acid, diphosphonic acid, triphosphonic acid, polyphosphonic acid, phosphonate or/and derivatives thereof such as for example hydroxyphosphonic acid or/and derivatives thereof can optionally also be added to or/and included in an activating agent such as activating agent A, B, C, D, E, F or/and G. HEDP (=(1-hydroxyethylidene) diphosphonic acid) for example is particularly preferred as the phosphonic acid. Such compounds serve in particular as complexing agents or/and as sequestering agents. In the process according to the invention the content of softening agents can preferably be zero or in the range from 0.0001 to 50 g/l and in particular 0.001 to 20 g/l in an aqueous activating agent such as activating agent A, C, D, E or/and G and preferably around zero or in the range from 0.001 to 25 wt. % and in particular 0.01 to 5 wt. % (for concentrates and baths) in a powdered activating agent such as activating agent B or/and F.

An activating agent such as activating agent A, B, C, D, E, F or/and G can furthermore optionally also contain at least one addition of at least one stabilising agent. Such a stabilising agent stabilises the titanium phosphate colloids. The stabilising agent can contain or be at least one substance such as for example at least one organic copolymer, pyrophosphate, tripolyphosphate or/and phosphonate, each based on at least one organic polymer. The activating agent preferably contains as stabilising agent in particular at least one anionically modified polysaccharide, water-soluble organic copolymer such as for example in particular one based on acrylate, ethylene or/and polyelectrolyte, carboxylic acid, phosphonic acid, diphosphonic acid, triphosphonic acid, polyphosphonic acid, polyelectrolyte or/and derivatives thereof such as for example carboxylic acid esters, phosphonic acid esters or/and derivatives thereof. Stabilisation takes place by means of electrostatic or/and steric stabilisation. Although orthophosphates also have a certain but not a high stabilising effect, they are not termed stabilising agents within the meaning of this application.

In the process according to the invention the content of stabilising agents can preferably be around zero or in the range from 0.0001 to 300 g/l and in particular 1 to 200 g/l in an aqueous activating agent such as activating agent A, C, D, E or/and G and preferably around zero or in the range from 0.001 to 80 wt. % and in particular 1 to 60 wt. % (for concentrates and baths) in a powdered activating agent such as activating agent B or/and F.

In the process according to the invention an aqueous activating agent such as an activating agent A, C, D, E or/and G can preferably also include a content of a detergent mixture, at least one surfactant or/and at least one hydrotrope such as for example at least one alkane sulfate, alkane sulfonate or/and glycol, or such a content can be added to the activating agent. All amphoteric, non-ionic, anionic and cationic surfactants can be used in principle as surfactants. In the process according to the invention the content of at least one detergent mixture, surfactant or/and hydrotrope can preferably be around zero or in the range from 0.001 to 100 g/l and in particular in the range from 0.005 to 50 or from 0.01 to 10 g/l in an activating agent such as activating agent A, C, D, E or/and G and preferably around zero or in the range from 0.01 to 99 wt. % and in particular in the range from 0.05 to 90 or from 0.1 to 80 wt. % (for concentrates, baths and activating cleaning agents) in a powdered activating agent such as activating agent B or/and F.

Furthermore, a very wide variety of substances can be used for pH adjustment or/and to buffer the chemical system, preferably at least one borate or/and at least one carbonate. Alkali metal compounds such as for example at least one alkali borate or/and at least one alkali carbonate are particularly preferred. The content of these compounds can vary within broad limits. It is preferably either around zero or is commonly 0.1 to 200 g/l or preferably 1 to 100 g/l in an aqueous activating agent such as activating agent A, C, D, E or/and G or is preferably around zero or is 0.01 to 95 wt. % and in particular 0.1 to 90 or 1 to 80 wt. % (for concentrates, baths and activating cleaning agents) in a powdered activating agent such as activating agent B or/and F.

In the process according to the invention the activating agent can preferably also include a content of at least one biocide. In the process according to the invention the content of biocide(s) can preferably be around zero or in the range from 0.0001 to 2 g/l and in particular in the range from 0.005 to 0.3 or from 0.01 to 0.05 g/l in an activating agent such as activating agent A, B, C, D, E, F or/and G and preferably around zero or in the range from 0.01 to 10 wt. % and in particular in the range from 0.05 to 2 or from 0.1 to 1.5 wt. % (for concentrates and baths) in an activating agent such as activating agent B.

The pH in an aqueous activating agent such as activating agent A, C, D, E or/and G is preferably in the range from 7 to 13, particularly preferably in the range from 8 to 12 or 8.5 to 11. In some embodiments the pH can also be less than 7 if it does not lead to disruptive precipitations in the activating agent bath or greater than 13 if this bath does not corrode the installation components too severely.

In the process according to the invention an aqueous colloidal activating agent according to the invention such as activating agent C, E or/and G can preferably be applied to the metallic surfaces at a temperature in the range from 10 to 80° C., particularly preferably in the range from 15 to 60 or from 20 to 50° C.

In the process according to the invention the activating agent according to the invention can preferably be applied to the metallic surfaces by flow coating, flow soldering, spraying, dip coating or/and roll coating and optionally squeegeeing. In most embodiments the activating agent is applied by spraying or dip coating.

In the process according to the invention the metallic surfaces can preferably be cleaned, degreased or/and pickled prior to activation and subsequently or/and in between optionally rinsed with water. In many embodiments it is necessary to rinse with water subsequently after cleaning, degreasing or/and pickling.

In the process according to the invention the metallic surfaces can preferably be rinsed with water after activation and prior to phosphating. In many embodiments this rinsing is optional.

In the process according to the invention, after being activated the metallic surfaces can preferably be phosphated, rewashed or/and given at least one organic coating such as for example at least one primer, at least one paint, at least one adhesive carrier or/and at least one adhesive. Following application of a coating the metallic surfaces can be dried, rinsed or rinsed and then dried if required.

In tests the coating weight of the zinc phosphate coat produced has proved to be good at values from 1.5 to 3 $g/m^2$, satisfactory at values from >3 to <4 $g/m^2$ and mostly satisfactory at values of between around 1 and 1.5 and between 4 and 4.5 $g/m^2$. However, the coating weight is not the only criterion for assessing the quality of an activating agent bath. In fact the visually detectable uniformity of the zinc phosphate coat, the degree of coverage with the zinc phosphate coat, the corrosion test results or/and the paint adhesion test results can also be used. Furthermore, the activating agents according to the invention have normally proved to be good if their activating effect turned out to be good or very good for at least 120 h, this being measurable in particular from the coating weight. A good to satisfactory activating effect could be obtained with activating agent baths according to the invention even for more than 300 h. The reduction in the activating effect is demonstrated in particular by the rise in the coating weight of the zinc phosphate coat to values above 3.5 $g/m^2$ and by the macroscopically detectable degree of coverage with the zinc phosphate coat or by metallically bright areas or by areas with incipient rust.

Surfaces of all types of materials—optionally also of multiple different materials adjacently or/and successively in the process—can be used in principle as surfaces, in particular all types of metallic materials. Of the metallic materials, all types of metallic materials are possible in principle, in particular those comprising aluminium, iron, copper, titanium, zinc, tin or/and alloys with a content of aluminium, iron, steel, copper, magnesium, nickel, titanium, zinc or/and tin, wherein they can also be used contiguously or/and successively. The material surfaces can optionally also be pre-coated, for example with zinc or with an alloy containing aluminium or/and zinc.

The object is moreover achieved by means of an aqueous colloidal activating agent based on titanium phosphate and at least one further non-titanium-containing phosphate for the treatment of metallic surfaces prior to phosphating, wherein the activating agent contains at least one water-soluble silicon compound having at least one organic group.

The object is furthermore achieved with an aqueous colloidal activating agent A, which was prepared substantially by mixing, compounding or/and granulating the components, or with an aqueous colloidal activating agent C, which was prepared from an aqueous colloidal activating agent A using a powdered activating agent B and in which the powdered activating agent B was then dissolved and dispersed in water for application, or with an aqueous colloidal activating agent E which was prepared from an aqueous colloidal activating agent A using an aqueous colloidal activating agent D and in which the aqueous activating agent E was prepared by diluting with water, or with an aqueous colloidal activating agent G which was prepared from a powdered activating agent F, the powdered activating agent F being prepared substantially by mixing, compounding or/and granulating the components and the aqueous colloidal activating agent G being prepared therefrom by dissolving and dispersing in water, the term "colloidal" referring only to titanium phosphate colloids, the colloidal activating agent containing titanium phosphate and at least one further, non-titanium-containing, phosphate and in the concentration for a treatment bath serving for the treatment of metallic surfaces prior to phosphating, wherein the colloidal activating agent also contains at least one water-soluble silicon compound having at least one organic group.

The activating agent can preferably also contain a composition corresponding to one of the method claims, in particular at least one stabilising agent.

As far as the applicant is aware, with the aqueous or powdered activating agent according to the invention it is surprisingly possible for the first time to achieve a bath working life which without or almost without the addition of concentrates or/and supplementary agents can readily be used for more than 120 h. Either no additives are added or at most concentrates or/and supplementary agents up to the amount of the small bath volume discharged over the period of use of the bath are added, achieving a virtually constant low coating weight in the range of for example 1.0 to 3.5 $g/m^2$.

The activating agent according to the invention can furthermore also preferably be added to a cleaning agent and used in a cleaning agent. It is possible in this way to clean and to activate in a single step, thus saving at least one bath. This is particularly advantageous for simple production processes without very high quality requirements.

The metallic objects activated and phosphated by the process according to the invention and optionally also further coated can be used in particular in the automotive industry, automotive supply industry and steel industry as well as in the construction industry and in tool building. The substrates coated by the process according to the invention can be used above all as a wire, wire mesh, strip, sheet, profile, cladding, part of a vehicle or aircraft, element for a domestic appliance, element in the construction industry, frame, crash barrier element, radiator element or fencing element, formed part having a complex geometry or a small part such as, for example, a bolt, nut, flange or spring.

With the process according to the invention it was possible to improve still further the bath working life, bath stability, crystal size, resistance at elevated operating temperature and corrosion protection.

It was surprising that by the addition of a very small amount of at least one silicon compound the usage life of the activating agent could in some cases by increased by a factor of approximately 5 to 10 even without supplementing the activating agent.

It was also surprising that the thermal stability (=resistance at a usage temperature of the activating agent above 50° C.) could be markedly improved.

It was moreover surprising that not only a stabilising effect for the coating weight but also an improving effect for the refinement of the phosphate crystal sizes occurred to lasting effect, since the particle size level too was often established at average crystal sizes in the range from 3 to 10 μm when viewed under a scanning electron microscope.

It was further surprising that the quality of the deposited phosphate coat did not deteriorate due to the introduction of the measures according to the invention but was able to be maintained at a uniform quality to lasting effect. Furthermore, the coating weight of the phosphate coat remained largely constant over the entire production period, for in a laboratory test over 5 working days the coating weight variations were in fact able to be reduced from originally +/−0.1 to +/−3.0 g/$m^2$ with a conventional activating agent bath to +/0.1 to +/−1.0 g/$m^2$ with an activating agent bath according to the invention.

EXAMPLES AND COMPARATIVE EXAMPLES

The subject matter of the invention is described in more detail by means of embodiment examples. The examples were performed using the substrates, process, steps, substances and mixtures listed below:

The specimen sheets consisted of cold-rolled steel (CRS) with a thickness of 1.2 mm or steel galvanised on both sides and with a hot-dip galvanised coating (HDG) or an electrogalvanised coating (EG) in a thickness of approx. 7 μm on each side. The surface area of the substrates measured over both sides was approximately 400 $cm^2$.

a) The substrate surfaces were cleaned and thoroughly degreased in a 2.5% solution of an alkaline detergent for 10 minutes at 60° C.

b) This was followed by rinsing with tap water for 0.5 minutes at room temperature.

c) The surfaces were then activated by dipping them in a colloidal activating agent containing titanium phosphate for 0.5 minutes at room temperature. The activating agents are set out in Table 2. Activating agents A were prepared by mixing, adding water and optionally compounding at elevated temperature. Activating agents B were prepared from activating agent A by adding a plurality of additives in the solid state and mixing. Activating agents C were prepared from activating agents B by adding water, stabilising agent(s), silane and optionally an additive for pH adjustment and stirring. This was followed by dispersion and dissolution in water. Activating agents D were prepared from activating agents A containing additional water and additionally already containing a first stabilising agent, by adding water, stabilising agent(s), optionally silane and at least one additive whilst stirring. Activating agents E were prepared from activating agents D by adding water, stabilising agent and optionally silane and stirring. It made no difference to the characteristics of activating agent E whether silane was added to activating agent D or was not added until activating agent E was prepared.

d) The surfaces were then zinc-phosphated for 3 minutes at 55° C. by dipping them in a phosphating solution. The phosphating solutions used are characterised below.

e) They were then rinsed first with tap water and then with demineralised water.

f) The coated substrates were then dried in a drying oven at 100° C. for 10 minutes.

g) Finally the dry specimen sheets were provided with a cathodic dip coating and coated with the additional coats of a conventional coating composition used for bodywork in the automotive industry (coating composition and paints as used by Daimler AG in moonlight silver).

The composition of the various activating agents and the results of the tests are given in Tables 2 and 3 respectively.

Each silane that was added to the activating agent was partially or fully hydrolysed or/and condensed beforehand. The pH of the aqueous solution was optionally adjusted during this process.

Silane types containing at least one organic group:

1 Alkoxysilane A
2 Alkoxysilane B
3 Alkoxysilane C
4 Alkoxysilane D
5 Phenylsilane
6 Succinic acid silane
7 Triamino-functional silane
8 Epoxy silane.

Pyrophosphate(s), tripolyphosphate(s), thickening agents or/and at least one of the additives 9 to 11 were used as stabilising agents in the activating agents.

Additive no.:

9 1-Hydroxyethylene(1,1-diphosphonic acid)
10 Amorphous silica
11 Carboxylic acid copolymer The thermal stability is specified in the tables such that in the tests the values of the coating weight of the subsequently produced zinc phosphate coat did not exceed the value range from 1.5 to 3 g/$m^2$ at an activating agent bath temperature of for example 40° C., the individual bath working life also being taken into consideration in the assessment. The coating weight was determined using a Gardometer model . . . ?? from . . . ?? using the determination principle specified in . . . at . . . .

Furthermore, it was determined, by radiography on a specimen of an activating agent A containing virtually no water, that primarily $Na_2HPO_4$, $Na_2HPO_4.2H_2O$ and small amounts of $TiOSO_4$ are present as crystalline substances. Titanium phosphate could not be detected here by powder diffractometry.

The average crystal size was roughly estimated by viewing under a scanning electron microscope (SEM) or from suitably enlarged SEM images.

TABLE 2

| Activating agents used | | | | | | | | | |
|---|---|---|---|---|---|---|---|---|---|
| | Compositions according to the invention | | | | | | | | |
| Contents in g/l | E 1 | E 2 | E 3 | E 4 | E 5 | E 6 | E 7 | E 8 | E 9 |
| Activating agent mixture | 0 | 1 | 2 | 3 | 4 | 8 | 11 | 12 | 13 |
| Activiating agent type | C | C | C | C | C | C | C | C | C |
| Ti | 0.0065 | 0.0065 | 0.0065 | 0.0065 | 0.0065 | 0.0065 | 0.0065 | 0.0065 | 0.0065 |
| $PO_4$ | 0.68 | 0.45 | 0.66 | 0.66 | 0.62 | 1.33 | 1.20 | 1.10 | 0.93 |
| $P_2O_5$ | 0.51 | 0.33 | 0.48 | 0.48 | 0.46 | 0.98 | 0.88 | 0.78 | 0.68 |
| $Na^+$ | 0.31 | 0.22 | 0.31 | 0.31 | 0.30 | 0.64 | 0.66 | 0.68 | 0.66 |
| $CO_3^{2-}$ | — | — | — | — | — | — | 0.11 | 0.22 | 0.36 |
| $SO_4^{2-}$ | 0.016 | 0.016 | 0.016 | 0.016 | 0.016 | 0.016 | 0.016 | 0.016 | 0.016 |
| Silane type | 1 | 1 | 1 | 1 | 1 | 1 | 1 | 1 | 1 |

TABLE 2-continued

| | Activating agents used | | | | | | | | |
|---|---|---|---|---|---|---|---|---|---|
| Silane content | 0.015 | 0.0075 | 0.0075 | 0.0075 | 0.0075 | 0.0075 | 0.0075 | 0.0075 | 0.0075 |
| Content of pyrophosphate | no | no | no | no | no | no | no | no | no |
| Content of tripolyphosphate | yes | no | no | no | no | no | no | no | no |
| Additive no. | — | — | — | 9 | 9 | — | — | — | — |
| Content | — | — | — | 0.010 | 0.050 | — | — | — | — |
| pH | 9.0 | 9.4 | 9.8 | 9.8 | 9.8 | 9.9 | 9.7 | 9.7 | 9.5 |
| Stability for ... hours | 144 | 144 | 144 | 144 | 144 | 144 | 144 | 144 | 144 |
| Long-term stability: quality | very good | very good | very good | very good | very good | very good | very good | very good | very good |
| Thermal stability: ° C. | 40 | 40 | 40 | 40 | 40 | 40 | 40 | 40 | 40 |
| Thermal stability: quality | very good | very good | very good | very good | very good | very good | very good | very good | very good |

| | Compositions according to the invention | | | | | | | | |
|---|---|---|---|---|---|---|---|---|---|
| Contents in g/l | E 10 | E 11 | E 12 | E 13 | E 14 | E 15 | E 16 | E 17 | E 18 |
| Activating agent mixture | 1 | 1 | 1 | 1 | 1 | 1 | 1 | 1 | 1 |
| Activating agent type | C | C | C | C | C | C | C | C | C |
| Ti | 0.0065 | 0.0065 | 0.0065 | 0.0065 | 0.0065 | 0.0065 | 0.0065 | 0.0065 | 0.0065 |
| $PO_4^{3-}$ | 0.45 | 0.45 | 0.45 | 0.45 | 0.45 | 0.45 | 0.45 | 0.45 | 0.45 |
| $P_2O_5$ | 0.33 | 0.33 | 0.33 | 0.33 | 0.33 | 0.33 | 0.33 | 0.33 | 0.33 |
| $Na^+$ | 0.22 | 0.22 | 0.22 | 0.22 | 0.22 | 0.22 | 0.22 | 0.22 | 0.22 |
| $SO_4^{2-}$ | 0.016 | 0.016 | 0.016 | 0.016 | 0.016 | 0.016 | 0.016 | 0.016 | 0.016 |
| Silane type | 3 | 4 | 5 | 6 | 7 | 8 | 1 | 1 | 1 |
| Silane content | 0.007 | 0.07 | 0.017 | 0.030 | 0.025 | 0.008 | 0.0075 | 0.0075 | 0.0075 |
| Content of pyrophosphate | no | no | no | no | no | no | no | no | no |
| Content of tripolyphosphate | no | no | no | no | no | no | no | no | no |
| pH | 9.9 | 9.8 | 10.3 | 10.3 | 10.3 | 9.7 | 10.5 | 10.4 | 10.2 |
| Stability for ... hours | 48 | 24 | 24 | 24 | 48 | 24 | 144 | 144 | 144 |
| Long-term stability: quality | average | poor | poor | poor | average | poor | very good | very good | very good |
| Thermal stability: ° C. | 40 | 40 | 40 | 40 | 40 | 40 | 25 | 30 | 50 |
| Thermal stability: quality | average | poor | poor | poor | average | poor | very good | very good | good* |

*slight rise in coating weight

| | Compositions according to the invention | | | | | | | | |
|---|---|---|---|---|---|---|---|---|---|
| Contents in g/l | E 19 | E 20 | E 21 | E 22 | E 23 | E 24 | E 25 | E 26 | E 27 |
| Activating agent mixture | 1 | 1 | 8 | 9 | 11 | 12 | 13 | 13a | 13 |
| Activating agent type | C | C | C | C | C | C | C | C | C |
| Ti | 0.0065 | 0.0065 | 0.0065 | 0.0065 | 0.0065 | 0.0065 | 0.0065 | 0.0065 | 0.0065 |
| $PO_4$ | 0.45 | 0.45 | 1.33 | 1.34 | 1.20 | 1.10 | 0.93 | 0.66 | 0.93 |
| $P_2O_5$ | 0.33 | 0.33 | 0.98 | 0.9858 | 0.88 | 0.78 | 0.68 | 0.48 | 0.68 |
| NA+ | 0.22 | 0.22 | 0.64 | 0.63 | 0.66 | 0.68 | 0.66 | 0.31 | 0.66 |
| $CO_3^{1-}$ | — | — | — | — | 0.11 | 0.22 | 0.36 | — | 0.36 |
| $SO_4^{2-}$ | 0.016 | — | 0.016 | 0.016 | 0.016 | 0.016 | 0.016 | 0.016 | 0.016 |
| Silane type | 1 | 1 | 1 | 1 | 1 | 1 | 1 | 2 | 2 |
| Silane content | 0.0075 | 0.0038 | 0.015 | 0.015 | 0.03 | 0.03 | 0.015 | 0.0075 | 0.027 |
| Content of pyrophosphate | no | no | no | no | no | no | no | no | no |
| Content of tripolyphosphate | no | no | no | no | no | no | no | no | no |
| pH | 10.1 | 9.4 | 9.7 | 9.8 | 10 | 9.8 | 9.5 | 9.6 | 9.6 |
| Stability for ... hours | 144 | 48 | 144 | 144 | 72 | 72 | 144 | 144 | 72 |
| Long-term stability: quality | average** | average | very good | very good | good | good | very good | very good | good |
| Thermal stability: ° C. | 60 | 40 | 40 | 40 | 40 | 40 | 40 | 40 | 40 |

TABLE 2-continued

| Activating agents used | | | | | | | | | |
|---|---|---|---|---|---|---|---|---|---|
| Thermal stability: quality | average** | average | very good | very good | good | good | very good | very good | good |

**marked rise in coating weight

| | Compositions according to the invention | | | | |
|---|---|---|---|---|---|
| Contents in g/l | E 28 | E 29 | E 30 | E 31 | E 32 |
| Activating agent mixture | 14 | 15 | 16 | 17 | 18 |
| Activating agent type | E | E | E | E | G |
| Ti | 0.0095 | 0.0030 | 0.0030 | 0.0031 | 0.0103 |
| $PO_4$ | 0.53 | 0.73 | 0.73 | 0.72 | 0.81 |
| $P_2O_5$ | 0.39 | 0.52 | 0.53 | 0.54 | 0.60 |
| $NA^+$ | 0.270 | 0.089 | 0.089 | 0.090 | 0.30 |
| $K^+$ | — | 0.45 | 0.46 | 0.46 | — |
| $CA^{2+}$ | 0.023 | 0.0078 | 0.0080 | 0.0080 | — |
| CU | — | 0.0030 | — | — | — |
| $NO_3^{1-}$ | 0.075 | 0.024 | 0.024 | 0.024 | — |
| $F^{1-}$ | 0.022 | 0.007 | 0.007 | 0.007 | — |
| $SO_4^{2-}$ | — | — | — | — | 0.024 |
| Silane type | 1 | 1 | 1 | 1 | 1 |
| Silane content | 0.0075 | 0.0075 | 0.015 | 0.0075 | 0.0075 |
| Thickening agent | 0.015 | 0.015 | 0.015 | 0.015 | — |
| Additive no. | 11 | 11 | 11 | 11 | — |
| Content | 0.046 | 0.046 | 0.046 | 0.003 | — |
| Pyrophosphate | no | yes | yes | yes | no |
| Tripolyphosphate | no | no | no | no | yes |
| pH | 9.8 | 9.8 | 9.8 | 10.1 | 9.8 |
| Stability for ... hours | 72 | 144 | 144 | 144 | 24 |
| Long-term stability: quality | good | very good | very good | very good | poor |
| Thermal stability: ° C. | 40 | 40 | 40 | 40 | 40 |
| Thermal stability: quality | good | very good | very good | very good | poor |

| | Comparative compositions | | | | | | |
|---|---|---|---|---|---|---|---|
| Contents in g/l | CE 1 | CE 2 | CE 3 | CE 4 | CE 5 | CE 6 | CE 7 |
| Activating agent mixture | 0 | 17 | 1 | 1 | 1 | 1 | 18 |
| Activating agent type | C | E | C | C | C | C | G |
| Ti | 0.0065 | 0.0031 | 0.0065 | 0.0065 | 0.0065 | 0.0065 | 0.0103 |
| PO4 | 0.68 | 0.72 | 0.45 | 0.45 | 0.45 | 0.45 | 0.81 |
| P2O5 | 0.51 | 0.54 | 0.33 | 0.33 | 0.33 | 0.33 | 0.60 |
| NA+ | 0.31 | 0.09 | 0.22 | 0.22 | 0.22 | 0.22 | 0.30 |
| K+ | — | 0.46 | — | — | — | — | — |
| Ca2+ | — | 0.008 | — | — | — | — | — |
| Cu | — | — | — | — | — | — | — |
| $NO_3^{1-}$ | — | 0.024 | — | — | — | — | — |
| $F^{1-}$ | — | 0.007 | — | — | — | — | — |
| $SO_4^{2-}$ | 0.016 | — | 0.016 | 0.016 | 0.016 | 0.016 | 0.024 |
| Silane type | — | — | — | — | — | — | — |
| Silane content | — | — | — | — | — | — | — |
| Thickening agent | — | 0.015 | — | — | — | — | — |
| Additive no. | — | 11 | — | 9 | 10 | 11 | — |
| Content | — | 0.003 | — | 0.050 | 0.006 | 0.050 | — |
| Pyrophosphate | no | yes | no | no | no | no | no |
| Tripolyphosphate | yes | no | no | no | no | no | yes |
| pH | 9.0 | 9.8 | 9.4 | 9.1 | 9.1 | 9.1 | 9.8 |
| Stability for ... hours | 24 | 48 | 24 | 48 | 24 | 48 | 24 |
| Log-term stability: quality | poor | average | poor | average | poor | average | poor |
| Thermal stability: ° C. | 40 | 40 | 40 | 40 | 40 | 40 | 40 |
| Thermal stability: quality | poor | average | poor | average | poor | average | poor |

Examples E 1 to E 27 according to the invention relate to powder activations and E 28 to E 31 to liquid activations. For the phosphate coating tests the phosphating solutions I to V were applied by dip coating. As accelerators they contained in addition to nitrate predominantly nitrite, nitroguanidine or hydrogen peroxide. As cations they contained in addition to alkali-metal ions, iron ions and the cations pickled out of metallic surfaces substantially only zinc, manganese and nickel as in typical low-zinc phosphating solutions. As anions they contained in some cases silicon hexafluoride and small amounts of free fluoride. The phosphating agents I to V were applied by dip coating. Their free acid numbers (FAN) were approximately in the range from 1.4 to 1.7, their total acid numbers (TAN) were approximately in the range from 22 to 28, their Fischer total acid numbers (FTAN) were approximately in the range from 15 to 20 and their A numbers as the ratio of FAN to FTAN were approximately in the range from 0.07 to 0.10. The coating weight was determined gravimetrically by weighing before and after stripping of the phosphate coat, stripping on aluminium alloys being carried out with nitric acid, stripping on steel and zinc-rich surfaces being carried out with ammonium dichromate solution. The various phosphating agents all had similar effects and were similarly good, but the crystal shapes and crystal sizes of the phosphate crystals varied markedly. Good or even very good phosphate coats were produced in all cases.

TABLE 3

Coatings and test results on coatings using the phosphating solutions with activation and phosphating over 5 days

| | E 1 | E 2 | E 3 | E 4 | E 5 | E 6 | E 7 | E 8 | E 9 |
|---|---|---|---|---|---|---|---|---|---|
| Type of sheets | CRS | CRS | CRS | CRS | CRS | CRS | CRS | CRS | CRS |
| Activating agent type | C | C | C | C | C | C | C | C | C |
| Activating agent no. | 17 | 1 | 2 | 3 | 4 | 8 | 11 | 12 | 13 |
| Coating weight $g/m^2$ at start | 1.7 | 1.7 | 1.5 | 1.5 | 1.5 | 1.8 | 1.6 | 1.3 | 1.7 |
| Coating weight $g/m^2$ at end | 2.0 | 2.0 | 1.8 | 1.5 | 1.6 | 2 | 1.5 | 1.7 | 1.7 |
| Coverage (visual), % | 100 | 100 | 100 | 100 | 100 | 100 | 100 | 100 | 100 |
| Appearance | uniform | uniform | uniform | uniform | uniform | uniform | uniform | uniform | uniform |
| Average crystal size μm at start | <5 | 5 | 5 | 5 | 5 | 5 | 5 | <5 | 5 |
| Average crystal size μm at end | <5 | 5 | 5 | 5 | 5 | 5-10 | 5 | <5 | 5 |
| Corrosion tests: | | | | | | | | | |
| Salt spray test DIN EN ISO 9227 over 1008 h | U < 1 | — | U < 1 | U < 1 | — | — | — | — | U < 1 |
| VDA climatic test VDA 621-415 over 10 cycles | 1.7 | — | 1.5 | 1 | — | — | — | — | 1.9 |
| CASS test DIN EN ISO 9227 CASS | <1 | — | <1 | <1 | — | — | — | — | <1 |
| Filiform test DIN EN 3665 | 0.6-0.8<br>1.8-3.2 | — | 0.5-0.7<br>3.0-4.5 | 0.3-0.5<br>2.8-3.8 | — | — | — | — | 0.9-1.3<br>2.5-3.8 |
| Stone-chip resistance as per DIN EN ISO 20567-1 after 10 cycles VDA | 1.5 | — | 1.5 | 2 | — | — | — | — | 1.5 |
| Paint adhesion tests: | | | | | | | | | |
| Cross-hatch adhesion as per BMW GS 90011 | 1 | — | 1 | 1 | — | — | — | — | 1 |
| | E10 | E 11 | E 12 | E 13 | E 14 | E 15 | E 16 | E 17 | E 18 |
| Type of sheets | CRS | CRS | CRS | CRS | CRS | CRS | CRS | CRS | CRS |
| Activating agent type | C | C | C | C | C | C | C | C | C |
| Activating agent no. | 1 | 1 | 1 | 1 | 1 | 1 | 1 | 1 | 1 |
| Coating weight $g/m^2$ at start | 2.5 | 3.5 | 4.1 | 4.4 | 2.5 | 5.3 | 2.5 | 5 | 3 |
| Coating weight $g/m^2$ at end | 5.5 | >5.5 | >7 | >7 | 3 | >7 | 3.8 | 5 | 4.4 |
| Coverage (visual) | 100 | 80 | 70 | 80 | 100 | 70 | 100 | 70 | 100 |
| Appearance | uniform | — | — | — | uniform | — | uniform | — | uniform |
| Average crystal size μm at start | 5 | 15 | 25 | 25 | 5-10 | 25 | 15 | 60 | 20 |
| Average crystal size μm at end | 60 | 40 | >60 | >60 | 10-15 | >60 | 20 | 60 | 25-30 |
| | E 19 | E 20 | E 21 | E 22 | E 23 | E 24 | E 25 | E 26 | E 27 |
| Type of sheets | CRS | CRS | CRS | CRS | CRS | CRS | CRS | CRS | CRS |
| Activating agent type | C | C | C | C | C | C | C | C | C |
| Activating agent no. | 1 | 1 | 8 | 9 | 11 | 12 | 13 | 13a | 13 |
| Coating weight $g/m^2$ at start | 2.2 | 2.1 | 2 | 3 | 1.8 | 2.0 | 1.4 | 1.4 | 1.7 |
| Coating weight $g/m^2$ at end | 1.8 | 1.6 | 3.1 | 4.7 | 1.7 | 2.2 | 4.5 | 4.4 | 1.6 |
| Coverage (visual), % | 100 | 100 | 100 | 100 | 100 | 100 | 100 | 100 | 100 |
| Appearance | uniform | uniform | uniform | uniform | uniform | uniform | uniform | uniform | uniform |
| Average crystal size μm at start | 5 | 5 | 5 | 10-15 | <5 | <5 | <5 | <5 | <5 |
| Average crystal size μm at end | 5 | 5 | 10-20 | 25 | 5 | <10 | 20 | 25 | <5 |
| Corrosion tests: | | | | | | | | | |
| Salt spray test DIN EN ISO 9227 over 1008 h | — | — | — | U < 1 | — | — | — | — | U < 1 |
| VDA climatic test VDA 621-415 over 10 cycles | — | — | — | 1.5 | — | — | — | — | 1.5 |
| CASS test DIN EN ISO 9227 CASS | — | — | — | <1 | — | — | — | — | <1 |
| Filiform test DIN EN 3665 | — | — | — | 0.4-0.5<br>2.6-3.9 | — | — | — | — | 0.9-1.3<br>2.6-4.1 |

TABLE 3-continued

Coatings and test results on coatings using the phosphating solutions with activation and phosphating over 5 days

| | | | | | | | | | |
|---|---|---|---|---|---|---|---|---|---|
| Stone-chip resistance as per DIN EN ISO 20567-1 after 10 cycles VDA | — | — | — | 1.5 | — | — | — | — | 1.5 |
| Paint adhesion tests: | | | | | | | | | |
| Cross-hatch adhesion as per BMW GS 90011 | — | — | — | 1 | — | — | — | — | 1 |

| | E 28 | E 29 | E 30 | E 31 | CE 1 | CE 2 |
|---|---|---|---|---|---|---|
| Type of sheets | CRS | CRS | CRS | CRS | CRS | CRS |
| Activating agent type | E | E | E | E | C | E |
| Activating agent no. | 14 | 15 | 16 | 17 | 1 | 17 |
| Coating weight g/m2 at start | 2.8 | 2.1 | 2.2 | 1.7 | 2.2 | 2.5 |
| Coating weight g/m2 at end | 3.5 | 2.5 | 2.4 | 2.0 | 4.8 | 4.2 |
| Coverage (visual) | 100 | 100 | 100 | 100 | 100 | 100 |
| Appearance | uniform | uniform | uniform | uniform | uniform | uniform |
| Average crystal size μm at start | 10 | <5 | <5 | <5 | 5 | 10 |
| Average crystal size μm at end | 15-25 | 5 | 5 | <5 | 50 | 30 |
| Corrosion tests: | | | | | | |
| Salt spray test DIN EN ISO 9227 over 108 h | — | — | — | U < 1 | U < 1 | — |
| VDA climatic test VDA 621-415 over 10 cycles | — | — | — | 1.7 | 1.8 | — |
| CASS test DIN EN ISO 9227 CASS | — | — | — | <1 | <1 | — |
| Filiform test DIN EN 3665 | — | — | — | 0.9-1.5<br>2.8-4.1 | 0.3-0.4<br>2.8-3.5 | — |
| Stone-chip resistance as per DIN EN ISO 20567-1 after 10 cycles VDA | — | — | — | 1.5 | 2 | — |
| Paint adhesion tests: | | | | | | |
| Cross-hatch adhesion as per BMW GS 90011 | — | — | — | 1 | 1 | — |

The lower the values for the corrosion and paint adhesion tests, the better the results. These tests showed that the corrosion results and the paint adhesion results were in some cases a little better and in no cases worse if activation according to the invention was used instead of activation according to the prior art.

In the examples according to the invention the zinc phosphate crystal sizes were in some cases somewhat smaller or even markedly smaller than in the comparative examples.

The invention claimed is:

1. A process for the phosphating of metallic surfaces, wherein prior to being phosphated the metallic surfaces are treated with an aqueous activating agent comprising from 5 to 90 wt. % water, titanium phosphate and at least one further non-titanium-containing phosphate, wherein the activating agent contains at least one water-soluble silicon compound having at least one organic group that is a hydrolysed or condensed member selected from silanes, silanols, siloxanes, polysiloxanes and combinations thereof, wherein the total content of water-soluble silicon compounds having at least one organic group in the activating agent is in the range from 0.0001 to 0.2 g/l, calculated in each case as silane or as the corresponding silicon-containing starting compound that is principally present, wherein the aqueous activating agent is colloidal, and wherein the content of titanium is in the range from 0.0001 to 10 g/l.

2. A process according to claim 1, wherein the aqueous activating agent is prepared from an aqueous activating agent precursor (precursor A) via a powdered activating agent (precursor B) and prior to being applied to the metallic surfaces is then dissolved and dispersed in water (activating agent C) or is prepared from an aqueous colloidal activating agent (precursor A) via an aqueous colloidal activating agent (precursor D) and prior to being applied to the metallic surfaces is then diluted in water (activating agent E).

3. A process according to claim 2, further comprising the step of adding at least one member selected from the group consisting of a biocide, a surfactant, a stabilizer and an additive for pH adjustment.

4. A process according to claim 1, wherein prior to being applied to the metallic surfaces the aqueous activating agent is dissolved and dispersed in water (activating agent G) from a powdered activating agent (precursor F).

5. A process according to claim 1, wherein the aqueous activating agent further comprises at least one member selected from the group consisting of orthophosphates, alkali metals and combinations thereof.

6. A process according to claim 1, wherein the phosphate content in the aqueous activating agent, calculated as $PO_4$, is in the range from 0.005 to 300 g/l.

7. A process according to claim 1, wherein the phosphate in the aqueous activating agent is selected from the group consisting of titanium phosphate, titanyl phosphate, disodium phosphate and dipotassium phosphate.

8. A process according to claim 1, wherein the total content of cobalt, copper or nickel in the aqueous activating agent is in the range from 0.00001 to 0.1 g/l.

9. A process according to claim 1, wherein the activating agent further comprises at least one member selected from the group consisting of anionically modified polysaccharides, water-soluble organic copolymers, carboxylic acids, phosphonic acids, diphosphonic acids, triphosphonic acids, polyphosphonic acids and polyelectrolytes.

10. A process according to claim 1, wherein the activating agent also includes a content of a detergent mixture, at least one surfactant or at least one hydrotrope.

11. A process according to claim 1, wherein the activating agent also includes a content of at least one biocide, wetting agent, softening agent, complexing agent, sequestering agent or marker.

12. A process according to claim 1, wherein the activating agent is a colloidal solution or colloidal dispersion or a powdered activating agent, the latter being dissolved and dispersed for use in a coating process.

13. A process according to claim 1, wherein the activating agent is applied to the metallic surfaces at a temperature in the range from 10 to 80° C.

14. A process according to claim 1, wherein the activating agent is applied to the metallic surfaces by at least one method selected from the group consisting of flow coating, flow soldering, spraying, dip coating and roll coating.

15. A process according to claim 1, wherein prior to activation the metallic surfaces are cleaned, degreased or pickled or are rinsed with water after activation and prior to phosphating.

16. A process according to claim 1, wherein after activation the metallic surfaces are phosphated, rewashed or given at least one organic coating.

* * * * *